UNITED STATES PATENT OFFICE.

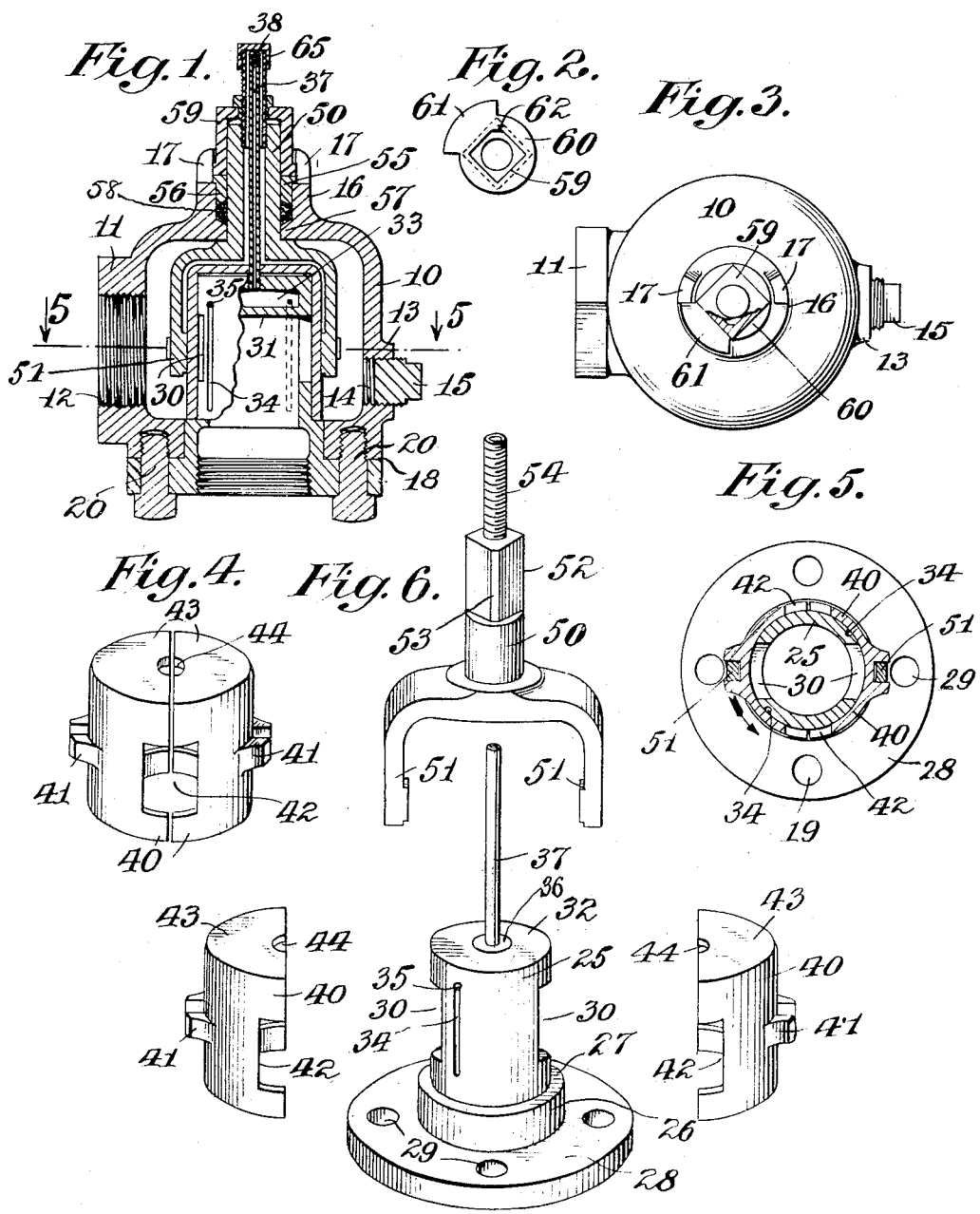

JOSEPH ROTHCHILD, OF NEW YORK, N. Y., ASSIGNOR TO JOHN SIMMONS COMPANY, OF NEW YORK, N. Y., A CORPORATION OF NEW YORK.

BLOW-OFF VALVE.

No. 920,779.    Specification of Letters Patent.    Patented May 4, 1909.

Application filed December 31, 1908. Serial No. 470,145.

*To all whom it may concern:*

Be it known that I, JOSEPH ROTHCHILD, a citizen of the United States, and resident of the borough of the Bronx, county of New York, in the State of New York, have invented certain new and useful Improvements in Blow-Off Valves, of which the following is a specification.

My invention relates to blow-off valves and its novelty consists in the construction and adaptation of the parts as will be hereinafter pointed out. It is an improvement upon or modification of the valve of my invention described and illustrated in a co-pending application for Letters Patent of the United States, Serial No. 371,713, filed May 3, 1907, and like that valve has for its object the production of a valve capable of withstanding great pressures and kept closed thereby, yet readily moved, free from wear, readily lubricated and cheaply made.

In the drawings, Figure 1 is a central vertical section of the valve with the parts assembled, a portion of the discharge cylinder being shown in elevation; Fig. 2 is a bottom plan view of the detachable turning head; Fig. 3 is a top plan view of the parts shown in Fig. 1; Fig. 4 is a perspective of the assembled segments of the slide valve; Fig. 5 is a section on the plane of the line 5—5 in Fig. 1 and a top plan view of the discharge cylinder beneath that plane, and Fig. 6 is a perspective view of the discharge cylinder, the encircling slide valve segments and the valve stem.

In the drawings, 10 is a valve casing. It has at one side an external annular flange 11 internally threaded at 12 to connect with a pipe or other conduit and which flange opening constitutes the inlet port of the valve. At another convenient place it is provided with a small external annular flange 13 internally threaded at 14 to receive a threaded plug 15. It is restricted to a neck at 16 and is provided at the upper end of the neck with two lugs 17, 17, which serve as stops for the valve stem presently to be described. The lower edge 18 of the casing is flat and is provided with a number of recesses 19 internally threaded to receive the externally threaded ends of screws 20 adapted to hold the flange of the discharge cylinder in position.

Within the casing is the discharge cylinder 25. This comprises a cylindrical body expanded at the bottom 26 to form a shoulder 27 to afford a support for the encircling slide valve. It is further expanded at the bottom to form an annular flange 28 provided with a series of apertures 29 registering with the recesses 19 of the casing and adapted to receive the screws 20. It is provided with two longitudinal ports indicated at 30, 30, and in its upper part is traversed by a partition 31 whereby there is formed between it and its flat top 32, a chamber 33 constituting an oil reservoir. Channels 34 longitudinally arranged are formed in the external surface of the cylinder 25 and their upper ends communicate with the chamber 33 by ducts 35. There is a hole in the top 32 closed by a plate 36 from which there extends upwardly an oil conduit or pipe 37 internally threaded at the top to receive a threaded screw plug 38.

Supported upon the shoulder 27 of the cylinder 25 is the slide valve made of two cylindrical segments 40, 40, identical in size and shape, both provided with a pair of projecting ears 41, 41, both recessed at 42, 42, and both having a right angled upper positioning disk 43, 43, recessed at 44 to engage the pipe 37. When assembled and when the inner edges of the two segments nearly touch, they form together a cylinder open at the bottom and closed at the top with diametrically opposite ports adapted to register with the ports 30 of the discharge cylinder.

The encircling slide valve is rotated by means of a hollow valve stem 50, having two downwardly projecting forks 51, 51, adapted to pass between and loosely engage the ears 41 of the slide valve. The stem is squared at 52 to form a turning head and one of its straight edges 53 is truncated in order accurately to determine the position with respect to it of a detachable turning head 59. Above the squared head it is rounded at 54 and externally threaded and incloses the pipe 37 which projects upwardly through the casing.

Within the upper rim of the casing is a bushing 55 having an outwardly projecting annular flange 56 and between the lower edge of which and an inwardly projecting annular flange 57 of the casing, is a suitable packing 58. Arranged above the bushing 55 and resting upon it is a detachable turning head 59 having an annular flange 60 at its bottom and provided with a projecting fin 61 adapted to engage the lugs 17, 17, on the casing. It also has one of its inner edges 62 beveled to register and engage with the corresponding outer beveled edge 53 of the squared head 52. A cap 65 serves to cover the top of the stem 50.

Like the construction of the valve described in the patent above referred to, the valve which is the subject matter of this application is tightened by the pressure of the incoming fluid against which it is closed. This pressure is brought to bear against the segment of the encircling slide opposite the inlet port of the casing and serves to press this segment against the corresponding portion of the discharge cylinder and to close it efficiently. Each of the segments of the slide valve are slightly longer internally than the external length of the discharge cylinder above the flange on which they rest, so that they clear the top of this cylinder. This construction affords an allowance for any grinding wear on the bottom of the segments.

It will be noted that the encircling slide valve can only be moved by the rotation of the stem a quarter of a revolution and that such movement is sufficient to open the valve fully or when in the reverse direction to close it completely. Furthermore, it will be noticed that no complete rotation of the stem and the encircling slide valve can take place, but that these parts are only permitted to oscillate and cannot become displaced when the parts have once been assembled. Another advantage of this form of valve is that the valved casing itself forms no part of the seat of the valve, but the effective portions of the valve in contact with each other are between the independent segments of the slide valve and the outer surfaces of the discharge cylinder, all of which parts are independent of the casing. Consequently no distortion of the casing, due to undue expansion and contraction of the pipes or fittings with which it is connected, can affect the efficiency of the valve, because such distortion will not be carried to the contacting surfaces.

The valve segments being movable with respect to the discharge cylinder and there being an appreciable space between the outside of these segments and the inner wall of the casing, it follows that the hollow pipe 37, the reservoir chamber 33, and the ducts 35 and channels in the discharge cylinder may all be blown out provided the end of the pipe 37 is connected with a pump or other source of fluid pressure, so that air bubbles or impurities may readily be removed from these parts and a fresh supply of clean oil be readily introduced thereto. This cannot be done when the valve is rigid with respect to either the casing or the discharge cylinder.

The small port on that side of the casing opposite the inlet port is intended to afford access to the interior of the valve in order that it may be cleaned and it is arranged diametrically opposite such inlet port for the purpose of allowing a cleaning tool to be inserted therein, and, if necessary, to reach back into the pipe or conduit connected to the inlet flange on the casing. I have shown this port of small size, but it may, of course, be made of any convenient size, and in some instances may be made even as large as the inlet port.

The parts of the valve are very simple in their construction and are very cheaply made, because they require very little machine finishing or accurate surfacing. They are quickly put together, and as quickly disassembled by simple tools, and in such a manner that no particular skill is required of the workmen.

What I claim as new is:—

1. In a valve of the character described, a discharge cylinder provided with ports and having an oil reservoir provided with channels leading therefrom to the external surface of the cylinder.

2. In a valve of the character described, a discharge cylinder having an internal oil reservoir, channels formed in the outer surface of the cylinder and ducts leading from the reservoir to said channels.

3. In a valve of the character described, a discharge cylinder provided with ports, and having an internal oil reservoir, channels formed in the outer surface of the cylinder and ducts leading from the reservoir to said channels.

4. In a valve of the character described, a discharge cylinder, an encircling valve, a stem adapted loosely to engage the valve and by which it may be rotated, an oil reservoir in the cylinder and a conduit through the stem leading thereto.

5. In a valve of the character described, a discharge cylinder, an encircling valve, a stem adapted loosely to engage the valve and by which it may be rotated, an oil reservoir in the cylinder; a conduit through the stem leading thereto, channels formed in the outer surface of the cylinder and ducts leading from the reservoir to said channels.

6. A blow-off valve comprising a discharge cylinder provided with suitable ports, a slide valve provided with ports and adapted to encircle the cylinder and means for introducing a supply of lubricant to the contacting surfaces between the cylinder and the valve, consisting of a reservoir within the cylinder and channels leading therefrom to the contacting surfaces.

7. In a valve of the character described, a discharge cylinder, an encircling valve, a stem adapted to engage the valve and by means of which it may be oscillated, an oil reservoir within the cylinder, channels leading therefrom to the contacting surfaces between the cylinder and valve and means for limiting the extent of oscillation of the valve.

8. In a valve of the character described, a discharge cylinder, an encircling valve, a stem adapted to engage the valve and by means of which it may be oscillated, an oil reservoir within the cylinder, longitudinal channels leading therefrom to the contacting surfaces between the cylinder and valve and means for limiting the extent of movement of the valve to prevent the uncovering of said channels.

9. In a valve of the character described, comprising a casing, a centrally arranged discharge cylinder having longitudinal ports in its sides, a transverse oil reservoir at one end and a terminal flange whereby it may be secured to the casing.

10. In a valve of the character described, comprising a casing, a centrally arranged discharge cylinder having longitudinal ports in its sides, a transverse oil reservoir at one end and a terminal flange whereby it may be secured to the casing and an intermediate shoulder adapted to form a support for an encircling slide valve.

11. In a valve of the character described, comprising a casing, a centrally arranged discharge cylinder having longitudinal ports in its sides, a transverse oil reservoir at one end and a terminal flange whereby it may be secured to the casing and an intermediate shoulder adapted to form a support for an encircling slide valve having ports adapted to register with those of the cylinder.

12. In a valve of the kind described, a discharge cylinder having an interior oil reservoir, a pipe leading thereto on the one side and ducts leading therefrom on the other.

13. A blow-off valve comprising a discharge cylinder, an encircling slide valve therefor, a hollow stem adapted to engage the slide valve, an oil reservoir within the cylinder and a pipe leading to the reservoir and passing through the stem.

14. A blow-off valve comprising an external casing, a discharge cylinder, an encircling slide valve therefor, a hollow stem adapted to engage the slide valve, an oil reservoir within the cylinder and a pipe leading to the reservoir and passing through the stem.

15. A blow-off valve comprising a discharge cylinder provided with ports and having a top plate and an outwardly extending flange and an encircling slide valve adapted to rest on the flange and made of independent segments, each provided with inwardly extending flanges adapted to rest on the top plate.

16. A blow-off valve comprising a discharge cylinder provided with ports and having a top plate and an outwardly extending flange, and an encircling slide valve adapted to rest on the flange and made of independent segments, each provided with inwardly extending flanges adapted to rest on the top plate and means for oscillating the slide valve, consisting of a stem adapted loosely to engage both segments.

17. A blow-off valve comprising a discharge cylinder provided with an internal oil reservoir and channels leading therefrom to the surface of the cylinder and having ports, and having a top plate and an outwardly extending flange, and an encircling slide valve adapted to rest on the flange and made of independent segments, both provided with inwardly extending flanges adapted to rest on the top plate.

18. A blow-off valve comprising a discharge cylinder provided with an internal oil reservoir and channels leading therefrom to the surface of the cylinder and having ports, and having a top plate and an outwardly extending flange, and an encircling slide valve adapted to rest on the flange and made of independent segments, both provided with inwardly extending flanges adapted to rest on the top plate and means for oscillating the slide valve, consisting of a stem adapted loosely to engage both segments.

19. A blow-off valve comprising a discharge cylinder provided with ports and having an interior oil reservoir and a top plate and an outwardly extending flange, and an encircling slide valve adapted to rest on the flange, and made of independent segments, each provided with inwardly extending flanges adapted to rest on the top plate and means for oscillating the slide valve, consisting of a stem adapted loosely to engage each segment.

20. A blow-off valve comprising a discharge cylinder provided with ports and having an interior oil reservoir and a top plate and an outwardly extending flange, and an encircling slide valve adapted to rest on the flange, and made of independent segments, each provided with inwardly extending flanges adapted to rest on the top plate and means for oscillating the slide valve, consisting of a stem adapted loosely to engage each segment and which stem is hollow and is provided with a conduit leading to the oil reservoir of the discharge cylinder.

21. A blow-off valve comprising a casing, a discharge cylinder, an encircling slide valve, a stem adapted loosely to engage the slide valve, a hole therethrough, an oil reservoir in the cylinder and a pipe in the hole leading to the reservoir.

22. A blow-off valve comprising a casing, a discharge cylinder, an encircling slide valve, a stem adapted loosely to engage the slide valve, a hole therethrough, an oil reservoir in the cylinder and a pipe in the hole leading to the reservoir and a detachable turning head on the stem.

23. A blow-off valve, comprising a casing, a discharge cylinder, an encircling slide valve, a stem adapted loosely to engage the slide valve, a hole therethrough, an oil reservoir in the cylinder and a pipe in the hole leading to the reservoir, a turning head on the stem, and means on the casing coöperating therewith to limit the extent of oscillation of the valve.

24. A blow-off valve comprising a casing, a discharge cylinder, an encircling slide valve, a stem adapted loosely to engage the slide valve, a hole therethrough, an oil reservoir in the cylinder and a pipe in the hole leading to the reservoir and a detachable turning head on the stem and means for positioning it with respect to the stem.

25. A blow-off valve comprising a casing, a discharge cylinder, an encircling slide valve, a stem adapted loosely to engage the slide valve, a hole therethrough, an oil reservoir in the cylinder and a pipe in the hole leading to the reservoir and a detachable turning head on the stem and means for positioning it with respect to the stem, consisting of coöperating beveled surfaces on the stem and inside of the turning head.

26. A blow-off valve comprising a casing, a discharge cylinder, an encircling slide valve, a stem adapted loosely to engage the slide valve, a hole therethrough, an oil reservoir in the cylinder and a pipe in the hole leading to the reservoir and a detachable turning head on the stem and means for positioning it with respect to the stem, consisting of coöperating beveled surfaces on the stem and inside of the turning head and means on the casing adapted to limit the movement of the turning head.

27. A blow-off valve comprising a casing, a discharge cylinder, an encircling slide valve, a stem adapted loosely to engage the slide valve, a hole therethrough, an oil reservoir in the cylinder and a pipe in the hole leading to the reservoir and a detachable turning head on the stem and means for positioning it with respect to the stem, consisting of coöperating beveled surfaces on the stem and inside of the turning head and means on the casing adapted to limit the movement of the turning head, including stop-lugs on the casing and a projecting fin on the head.

28. A blow-off valve comprising a casing, a discharge cylinder, an encircling slide valve, a stem adapted loosely to engage the slide valve, a hole therethrough, an oil reservoir in the cylinder and a pipe in the hole leading to the reservoir, in combination with a turning head on the stem and means for holding the parts together when in position, including an annular flange on the discharge cylinder.

29. A blow-off valve comprising a casing, a discharge cylinder, an encircling slide valve, a stem adapted loosely to engage the slide valve, a hole therethrough, an oil reservoir in the cylinder and a pipe in the hole leading to the reservoir, in combination with a turning head on the stem and means for holding the parts together when in position, including an annular flange on the discharge cylinder and a coöperating bottom edge on the casing.

30. A blow-off valve, comprising a casing, a discharge cylinder, an encircling slide valve, a stem adapted loosely to engage the slide valve, a hole therethrough, an oil reservoir in the cylinder and a pipe in the hole leading to the reservoir, in combination with a turning head on the stem and means for holding the parts together when in position, including an annular flange on the discharge cylinder, and a coöperating bottom edge on the casing and bolts or screws adapted to pass through the annular flange and engage the casing.

31. A blow-off valve comprising a casing, a discharge cylinder, an encircling slide valve, a stem adapted loosely to engage the slide valve, a hole therethrough, an oil reservoir in the cylinder and a pipe in the hole leading to the reservoir, in combination with a turning head on the stem provided with a projecting fin and means on the casing coöperating therewith to limit the extent of oscillation of the valve, consisting of projecting lugs adapted to embrace the fin on the turning head.

Witness my hand this 29th day of December, 1908, at New York, N. Y.

JOSEPH ROTHCHILD.

Witnesses:
HERMAN MEYER,
ALAN McDONNELL.